United States Patent [19]
Stadelhofer

[11] 3,786,598
[45] Jan. 22, 1974

[54] SELF-FEEDING WATERING SYSTEM FOR POTTED NURSERY PLANTS

[76] Inventor: Richard S. Stadelhofer, 14275 S. W. 232 St., Goulds, Fla. 33170

[22] Filed: Aug. 10, 1971

[21] Appl. No.: 170,458

[52] U.S. Cl. ............................................. 47/38.1
[51] Int. Cl. .......................................... A01g 27/00
[58] Field of Search .................... 47/38–39, 1.2, 47/34.12

[56] References Cited
UNITED STATES PATENTS

| 818,356 | 4/1906 | Davis | 47/38.1 |
| 1,216,642 | 2/1917 | White | 47/38.1 |
| 3,053,011 | 9/1962 | Silverman | 47/38 |

FOREIGN PATENTS OR APPLICATIONS

| 654,013 | 5/1951 | Great Britain |
| 1,024,483 | 1/1953 | France |

*Primary Examiner*—Robert E. Bagwill
*Attorney, Agent, or Firm*—Ernest H. Schmidt

[57] ABSTRACT

A plurality of vertically-extending wick members arranged in regularly spaced rows serve to receive, impaled thereon through bottom openings, potted nursery plants. The wick members are substantially rigid except for frayed wick portions extending outwardly of their upper ends; and are of such length as to extend upwardly into the soil of the containers in the vicinity of the root systems of the plants. A plurality of horizontally-disposed water pipes through which the lower ends of the wick members extend supply water without pressure head to central wick cords within the wick members, which cords, by capillary attraction, conduct water upwardly to their frayed upper ends for distribution, also by capillary attraction, through the soil in the containers. As moisture is utilized by the growing plants, capillary attraction from the wick members serves to maintain substantially constant moisture content irrespective of the varying demands of the plants, thereby achieving optimum growth.

6 Claims, 5 Drawing Figures

PATENTED JAN 22 1974  3,786,598
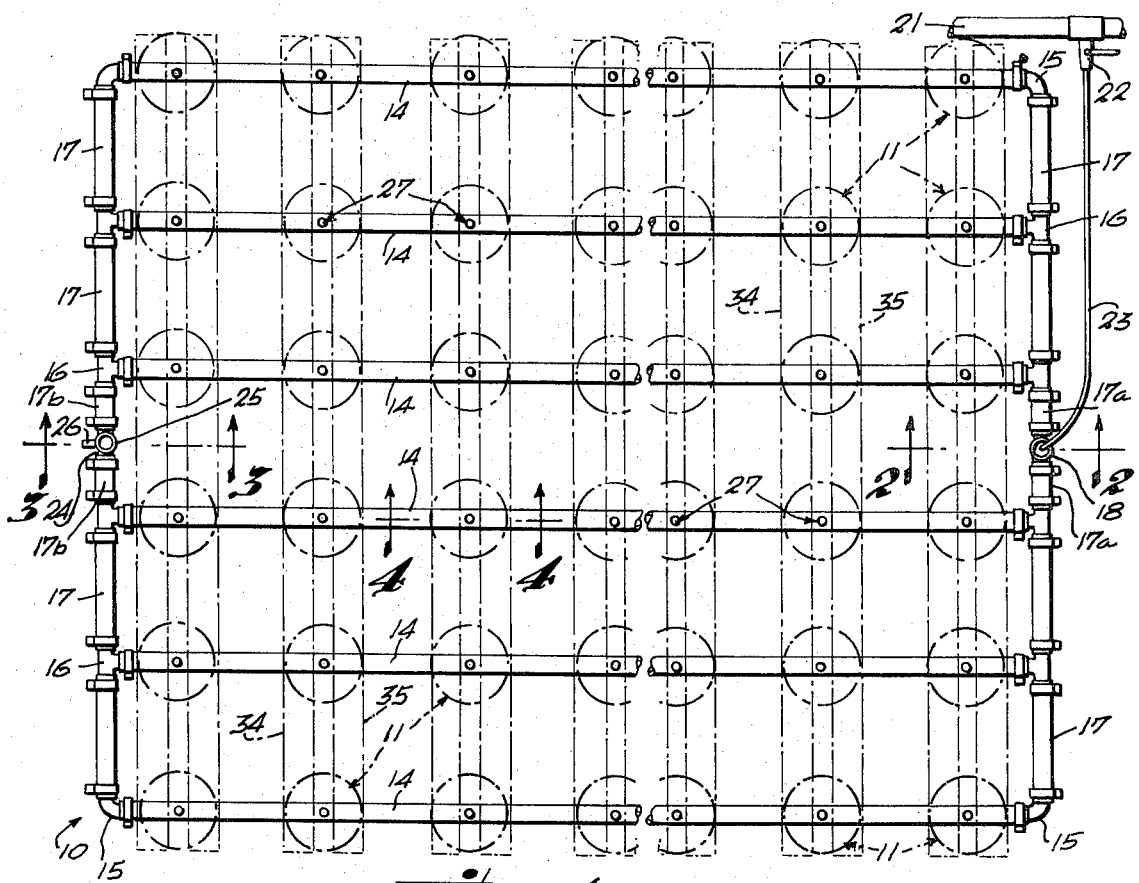
Fig. 1
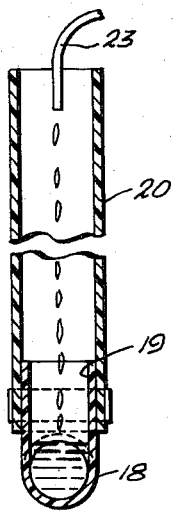
Fig. 2
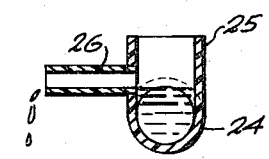
Fig. 3
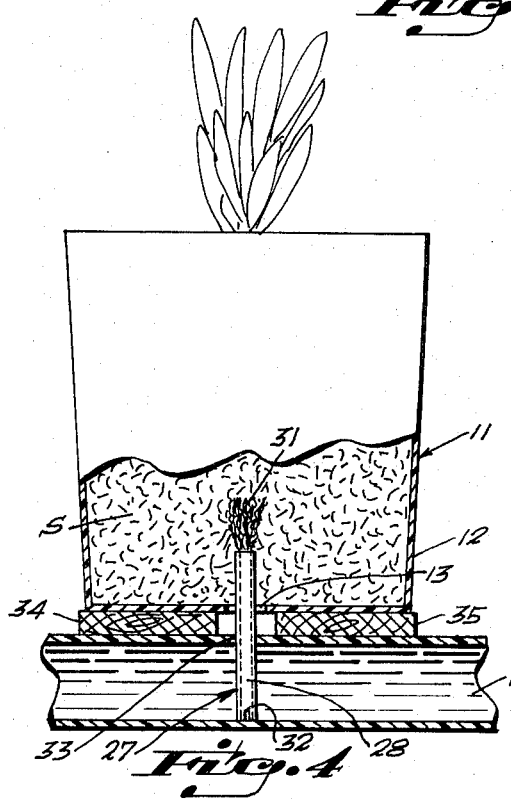
Fig. 4
Fig. 5
INVENTOR
RICHARD S. STADELHOFER
BY
Ernst H. Schmidt
ATTORNEY.

SELF-FEEDING WATERING SYSTEM FOR POTTED NURSERY PLANTS

This invention relates to systems for watering potted nursery plants, and is directed particularly to a novel and improved self-feeding watering system for potted nursery plants that continuously supplies moisture to the root systems of the plants by capillary attraction on a demand basis in accordance with the varying needs of the plants during their growth.

Various watering or irrigating systems for supplying moisture to the soil of potted nursery plants grown commercially in large quantities have heretofore been devised. Such watering systems as have heretofore been used are deficient in one or more respects, however, principally in that they rely on pressure, however slight, to force the water to permeate the soil in the vicinity of the plants' roots and thereby, in the process, wash away at least to some degree, small particle soil nutrients, which nutrients subsequently are washed out and lost through the bottom of the containers. This, in turn, requires the replacement of lost fertilizer from time to time in much greater quantities than actually required for optimum plant growth. Such watering systems also result at times in supplying excess water, and at other times in not supplying enough water. As a result optimum growth cannot be achieved and valuable growing time is lost.

It is, accordingly, the principal object of this invention to provide a novel and improved watering system for potted nursery plants that obviates the above-described deficiencies of watering systems heretofore known.

It is a more particular object of the invention to provide a watering system for potted nursery plants that will be self-feeding in accordance with the demands of the root systems of the plants being watered, and which will automatically accommodate for changes in moisture requirements from hour to hour and from day to day while the plants are growing.

Yet another object of the invention is to provide a watering system of the character above-described wherein moisture is supplied to the soil of the root systems of the nursery plants by capillary attraction through wick members extending upwardly through bottom openings in the plant containers, and wherein water supplied to the wick members at their lower ends is maintained at a constant level to insure a continuous and even distribution of moisture within the container soil in accordance with the damands of the nursery plants and without any possibility of soil flooding.

Yet another object of the invention is to provide a self-feeding watering system for potted nursery plants of the above nature wherein the wick members extend upwardly from a plurality of spaced, parallel water pipes, being arranged in spaced relation along the water pipes to provide a plurality of transverse rows of wick members, and wherein seating means is provided at the lower ends of the wick member for horizontal support for the bottoms of the nursery plant containers and wherein the containers have central bottom openings for the reception therethrough of upper end portions of the wick members into the soil of the containers in the vicinity of their plant root structures.

Yet another object of the invention is to provide a self-feeding watering system for potted nursery plants wherein the wick members each comprise a length of substantially rigid tubing through which a rope-like wick extends outwardly of the upper end of its tubing and is frayed thereat for intimate contact with the soil of an impaled container, the lower end of the length of tubing being inserted down through an opening in the water pipe to communicate with water being continuously supplied thereto.

It is still another object of the invention to provide a self-feeding watering system for potted nursery plants of the character described which will be simple in construction, economical in operation, dependable and long wearing in use, and effective in meeting the demands for moisture of potted nursery plants being grown in quantity production for effecting optimum growth in minimum growth intervals.

Other objects, features and advantages of the invention will be apparent from the following description when read with reference to the accompanying drawings. In the drawings, wherein like reference numerals denote corresponding parts throughout the several views:

FIG. 1 is a plan view, with portions broken away, of a self-feeding watering system for potted nursery plants embodying the invention;

FIG. 2 is a partial vertical cross-sectional view taken along the line 2—2 of FIG. 1 in the direction of the arrows and illustrating the mechanism for drip feeding water to the system;

FIG. 3 is a partial vertical cross-sectional view taken along the line 3—3 of FIG. 1 in the direction of the arrows and illustrating the overflow of water not being used by the system;

FIG. 4 is a partial vertical cross-sectional view taken along the line 4—4 of FIG. 1 in the direction of the arrows, and illustrating how a wick member is received in use through the bottom opening of a potted nursery plant; and FIG. 5 is an elevational view, partly in vertical cross-section, of one of the wick members, shown separately on an enlarge scale.

Referring now in detail to the drawings, reference numberal 10 in FIG. 1 designates a self-feeding watering system for potted nursery plants embodying the invention. The system lends itself particularly well to the watering of potted nursery plants 11, represented in broken lines in FIG. 1 (see also FIG. 4), in large scale commercial nursery quantities. As illustrated in FIG. 4, the plant containers 12 are provided with the usual central bottom opening 13 through which wick members of the self-feeding watering system project into the contained soil S in operation of the system, as is herein below more particularly described.

The self-feeding watering system 10 comprises a plurality of co-extensive, spaced, parallel water pipes 14, which will be supported in a common horizontal plane such as by being placed on a flat horizontal surface. Elbow fittings, 15, T-fittings 18, and short lengths of transverse piping 17 interconnecting the ends of the water pipes 14 at each side of the system comprise manifolds providing for water flow communication between all of the water pipes 14.

Means is provided, in the manifold at one end of the water pipes 14, for supplying water continuously to said water pipes. To this end short lengths of transverse pipe 17a, 17a have connected in series therewith and with the manifold at one end of the water pipes 14, a T-fitting 18 having an upwardly-extending arm or branch portion 19. Fitted to the arm 18 is a vertical extension pipe 20. A household water main 21 supplying water under pressure is provided with a control valve 22 feeding water through a supply conduit 23 into the upper opening end of the vertical extension pipe 20.

Means is also provided, in the manifold at the other end of water pipes 14, for discharging overflow water in said pipes. To this end a T-fitting 24 having an upstanding arm 25 is connected in series with the manifold at the other end of the water pipes 14 by short lengths of transverse pipe 17b, 17b. A discharge nipple 26 communicates with the upstanding arm 25 and extends sidewardly outwardly thereof (see FIG. 3). It will be noted that the lower interior wall portion of the discharge nipple 26 is at substantially the same level as the uppermost inner wall portion of the connector pipes 17b, 17b. The internal diameter of the pipes 17b, 17b will preferably be the same as that of the water pipes 14, so that when the watering system is in operation as herein below more particularly described, said water pipes will remain substantially full of water while at the same time not developing a pressure head because of the provision for overflow at the nipple 26.

Wick members 27 are inserted in spaced relation along the parallel water pipes 14 as is herein below more particularly described. As illustrated in FIGS. 4 and 5, each wick member 27 comprises a length of synthetic plastic tubing, preferably Nylon tubing 28, having an outer diameter of about one-quarter inch, through which a somewhat longer length of Nylon cord 29 is threaded. The lower or bottom end of the length of Nylon cord 29 is co-extensive with the lower end of the length of tubing 28, and is secured thereat by heat welding, as indicated at 30. The upper end of the Nylon cord 29 projecting outwardly of the length of tubing 28 is frayed, having its strands separated as indicated at 31, for the purpose hereinafter appearing. The lower ends of the wick members 27 are diagonally slotted to a depth beyond the extent of the weld 30 to provide for a free flow of water up through the bottom of wick member tubing 28.

As illustrated in FIGS. 1 and 4, regularly spaced openings 33 are provided along each of the spaced parallel water pipes 14, of such size as to receive and frictionally retain the wick members 27 pressed vertically down therein to the full extent permitted.

Preferably, the water pipes 14 will be fabricated of polyethylene, and the openings 33 will be made with a punch. With this method of assembly the plastic resiliency or "memory" of the polyethylene will have a tendency to exert a firm encircling grip upon the inserted wick members 27, insuring frictional retention while at the same time minimizing any possibility of water leakage. With this method of assembly it would not be necessary to cement or utilize any other means for retaining the wicks in place. If the water pipes 14 were chosen to be of a harder material such as polyvinyl chloride or PVC piping, the openings 33 would be drilled to snugly receive the wick members 27, after which they would be secured in place by a suitable cement appropriately applied around the outside of the drilled openings.

As illustrated in FIG. 1, the wick members 27 will be so spaced along their respective water pipes 14 as to align themselves in transversely-extending spaced, parallel rows along the lengths of said water pipes. A pair of elongated wood strips 34, 35 is preferably placed one to each side of each of the transversely aligned rows of wicks 27 for supporting the potted nursery plants 12.

In use, the potted nursery plants 11 will be placed down upon the wick members 27 so that the upper ends of said wick members pass through the container bottom openings 13 and impale themselves within the container soil S.

The containers 12 will thus be seated down upon the wood strips 34, 35, as best illustrated in FIG. 4. As illustrated in FIGS. 1 and 2, supply water from the water main 12 will be drip fed into the vertical extension pipe 20 through the supply conduit 23 at a rate sufficient to maintain the pipes 14 full of water without developing a pressure head therein. When this has been accomplished by a proper setting of the control valve 22 (see FIG. 2) excess water will drip from the T-fitting 24 at the opposite side of the pipe network through discharge nipple 26 (see FIG. 3). Water thus supplied to the water pipes 14 will flow through the slots 32 in the lower ends of the wick members 27 to be carried upwardly by capillary attraction to the frayed, outwardly-extending wick portions 31 in contact with the soil S in the containers. The moisture thus provided to the soil in the containers will be similarly carried by capillary attraction throughout the soil in the containers, particularly in the vicinity of the root structures of the contained nursery plants, to supply the moisture needed for rapid growth. It is to be noted that a sufficient volume of water will be supplied to the system through the supply conduit 23 to insure overflow at the discharge nipple 26, as described above, so that the changing demands for moisture of the growing plants will be met from hour to hour and from day to day without continual adjustment of the water supply control valve 22. In this connection it is further to be noted that the demands of the root systems of the plants not only increase from day to day as the plants and their root systems become larger, but also change from one part of the day to another because of variation in plant growth activity. Whatever the demands, as long as the supply pipes 14 are maintained full of water without any pressure head beyond that required to maintain such condition, the amount of moisture supplied to the soil of the individual plant containers will be sufficient to promote optimum growth without soil flooding. Because there can be no flooding of the soil with this system there will be no washing away or leaching out of soil nutrients, as occurs when water is supplied at the top of the containers.

While I have illustrated and described herein only one form in which my invention can conveniently be embodied in practice, it is to be understood that this form is given by way of example only and not in a limiting sense. The invention, in brief, includes all the embodiments and modifications coming within the scope and spirit of the following claims

What I claim as new and desire to secure by Letters Patent is:

1. A watering system for potted nursery plants the pots of which are formed with bottom openings, comprising, in combination, a plurality of upstanding wick members, each wick member comprising a substantially rigid tubular wick support member and a relatively flexible wick extending centrally through and outwardly of the upper end of said tubular wick support member said wick being fixed with respect to said wick support member, means for supplying water without pressure head to the lower ends of said wick members, whereby moisture will be carried upwardly through said wicks solely by capillary atrraction, said tubular wick support members being of such rigidity and such external diameter as to permit the impaling thereon of the potted nursery plants through the bottom openings thereof for supplying moisture throughout the soil of the potted plants through capillary attraction, said means for supplying water to the lower ends of said wick members comprising a horizontally-extending water pipe provided with spaced openings along its length through which lower end portions of said wick members extend, water supply means for continuously feeding water to one end of said pipe, and overflow means at the other end of said pipe for draining off such quantities of water supplied to said pipe as would otherwise develop a pressure head therein, said tubular wick support members being of a synthetic thermoplastic material and said wicks being of woven strands of a synthetic thermoplastic material, the lower ends of said wicks being co-extensive with their respective wick support members and being secured thereto at their lower ends by heat welding.

2. A watering system for potted nursery plants as defined in claim 1, wherein said tubular wick support members are of Nylon and wherein said wicks are of Nylon cord.

3. A watering system for potted nursery plants as defined in claim 1, wherein the lower ends of said wick support members are provided with through openings to allow for the flow of water into said wicks above said heat welds.

4. A watering system for potted nursery plants the pots of which are formed with bottom openings, comprising, in combination, a plurality of upstanding wick members, each wick member comprising a substantially rigid tubular wick support member and a relatively flexible wick extending centrally through and outwardly of the upper end of said tubular wick support member, means for supplying water without pressure head to the lower ends of said wick members, whereby moisture will be carried upwardly through said wicks solely by capillary attraction, said tubular wick support members being of such rigidity and such external diameter as to permit the impaling thereon of the potted nursery plants through the bottom openings thereof for supplying moisture throughout the soil of the potted plants through capillary attraction, said means for supplying water to the lower ends of said wick members comprising a plurality of laterally-spaced horizontally-extending water pipes co-extensive in length and provided with spaced openings along their lengths through which lower end portions of said wick members extend, water supply means for continuously feeding water to said pipes at one end thereof, and overflow means at the other end of said pipes for draining off such quantities of water supplied to said pipes as would otherwise develop a pressure head therein, said water supply means comprising an inlet manifold interconnecting said one ends of said pipes and an outlet manifold interconnecting said other ends of said pipes, said outlet manifold comprising a drainage nipple providing for drainage of water in said pipes at a level whereat said pipes are substantially full of water, said tubular wick support members being of a synthetic thermoplastic material and said wicks being of woven strands of a synthetic thermoplastic material, the lower ends of said wicks being co-extensive with their respective wick support members and being secured thereto at their lower ends by heat welding.

5. A watering system for potted nursery plants as defined in claim 4, wherein said wick members are arranged in spaced parallel rows extending transversely of said plurality of pipes.

6. A watering system for potted nursery plants as defined in claim 5, wherein said water supply means for continuously feeding water to said pipes comprises an upwardly-extending tubular arm communicating with said inlet manifold and a supply conduit feeding water into the upper end of said tubular arm by gravity.

* * * * *